US008514462B2

(12) United States Patent
Sohma et al.

(10) Patent No.: US 8,514,462 B2
(45) Date of Patent: Aug. 20, 2013

(54) PROCESSING DOCUMENT IMAGE INCLUDING CAPTION REGION

(75) Inventors: Hidetomo Sohma, Yokohama (JP); Tomotoshi Kanatsu, Tokyo (JP); Reiji Misawa, Tokyo (JP); Ryo Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 119 days.

(21) Appl. No.: 13/172,125

(22) Filed: Jun. 29, 2011

(65) Prior Publication Data

US 2012/0008174 A1    Jan. 12, 2012

(30) Foreign Application Priority Data

Jul. 6, 2010  (JP) .................................. 2010-154360
Jun. 9, 2011  (JP) .................................. 2011-129548

(51) Int. Cl.
*H04N 1/40* (2006.01)
(52) U.S. Cl.
USPC .............. 358/448; 358/1.9; 358/2.1; 358/462
(58) Field of Classification Search
USPC .................. 358/448, 538, 501; 382/164–180
See application file for complete search history.

(56) References Cited

U.S. PATENT DOCUMENTS

| 6,169,998 | B1 | 1/2001 | Iwasaki et al. |
| 6,178,434 | B1 | 1/2001 | Saitoh |
| 6,628,832 | B2 | 9/2003 | Kanatsu |
| 6,970,601 | B1 | 11/2005 | Kaneda et al. |
| 7,519,226 | B2 | 4/2009 | Kaneda et al. |
| 2003/0130968 | A1* | 7/2003 | Kutsumi et al. .................. 706/8 |
| 2005/0105148 | A1 | 5/2005 | Misawa |
| 2009/0154810 | A1 | 6/2009 | Enomoto et al. |
| 2010/0171999 | A1 | 7/2010 | Namikata et al. |
| 2010/0232690 | A1 | 9/2010 | Kanatsu et al. |
| 2010/0296736 | A1 | 11/2010 | Shiiyama et al. |
| 2010/0299355 | A1 | 11/2010 | Shiiyama et al. |

FOREIGN PATENT DOCUMENTS

| JP | 10-228473 A | 8/1998 |
| JP | 11-025113 A | 1/1999 |

OTHER PUBLICATIONS

Japanese Office Action issued on Dec. 25, 2012 concerning Japanese Application No. 2011-129548.
U.S. Appl. No. 13/162,266, filed Jun. 16, 2011, Applicants: Tomotoshi Kanatsu, et al.

* cited by examiner

*Primary Examiner* — Benny Q Tieu
*Assistant Examiner* — Marcellus Augustin
(74) *Attorney, Agent, or Firm* — Fitzpatrick, Cella, Harper & Scinto

(57) ABSTRACT

An image processing apparatus comprises: a character information acquisition unit configured to acquire character information included in each of a body region and a caption region; an accumulation unit configured to divide the character information acquired from the body region into predetermined set units and to accumulate the character information and position information of the divided set unit in a memory; an anchor term extraction unit configured to extract an anchor term from the character information acquired from the caption region; an anchor term search unit configured to search, based on the character information accumulated in the memory for each set unit, for the set unit including the anchor term extracted; a link information generation unit configured to generate link generation information that associates the set unit found by the anchor term search unit with the object region to which the caption region including the anchor term is appended.

6 Claims, 18 Drawing Sheets

| PAGE | OBJECT ID | ATTRIBUTE | OBJECT ID TO WHICH CAPTION IS APPENDED | CO-ORDINATE X | CO-ORDINATE Y | WIDTH W | HEIGHT H | CHARACTER INFORMATION |
|---|---|---|---|---|---|---|---|---|
| 1 | 601 | TITLE | - | X1 | Y1 | W1 | H1 | SAMPLE |
| 1 | 602 | TABLE | - | X2 | Y2 | W2 | H2 | - |
| 1 | 603 | PHOTO | - | X3 | Y3 | W3 | H3 | - |
| 1 | 604 | CHARACTER (IN 603) | - | X4 | Y4 | W4 | H4 | NEW PRODUCT |
| 1 | 605 | CAPTION | 603 | X5 | Y5 | W5 | H5 | FIGURE 1 AAA |
| 1 | 606 | BODY | - | X6 | Y6 | W6 | H6 | .........FIGURE 1 CONCERNS AAA |

| PAGE | CHARACTER INFORMATION ID | OBJECT ID | CHARACTER (CHARACTER CODE) | UPPER LEFT COORDINATE X | LOWER LEFT COORDINATE Y | LOWER RIGHT COORDINATE X | UPPER RIGHT COORDINATE Y |
|---|---|---|---|---|---|---|---|
| – | – | – | – | – | – | – | – |
| 1 | 611 | 606 | FIGURE (C611) | X1C611 | Y1C611 | X2C611 | Y2C611 |
| 1 | 612 | 606 | 1 (C612) | X1C612 | Y1C612 | X2C612 | Y2C612 |
| – | – | – | – | – | – | – | – |

FIG. 7

```
<?xml version="1.0"?>
<svg xmlns="http://www.w3.org/2000/svg" width="2480" height="3520"
    xmlns:x="http://@@@.jp">

<text x="X1" y="Y1" color="#000000">SAMPLE</text>
    ......

<g>
      <image x="X3" y="Y3" width="W3" height ="H3"
        xlink:href="dataimage/png;base64,Dez3632fsod6Xhd0dsc4d……."/>
      ......
    </g>

<text x="X4" y="Y4" color="#000000">NEW PRODUCT</text>

<text x="X5" y="Y5" color="#000000">FIGURE 1 AAA</text>

<text x="X6" y="Y6" color="#000000">… FIGURE 1 CONCERNS AAA …</text>

......

......

<x:action id ="initialize">
    init();
  <x:action>

......

<x:function name ="init">
    function init ()
    {
      ......
    }
  <x:function>

......

</svg>
```

- 711: ``
- 701: `<text ...>SAMPLE</text>`
- 702: ......
- 703: `<g> <image .../> ... </g>`
- 704: `<text ...>NEW PRODUCT</text>`
- 705: `<text ...>FIGURE 1 AAA</text>`
- 706: `<text ...>… FIGURE 1 CONCERNS AAA …</text>`
- 707: ......
- 712: ``
- 713: ......
- 714: `<x:action id ="initialize"> init(); <x:action>`
- 715: ......
- 716: `<x:function name ="init"> ... <x:function>`
- 717: ......

700

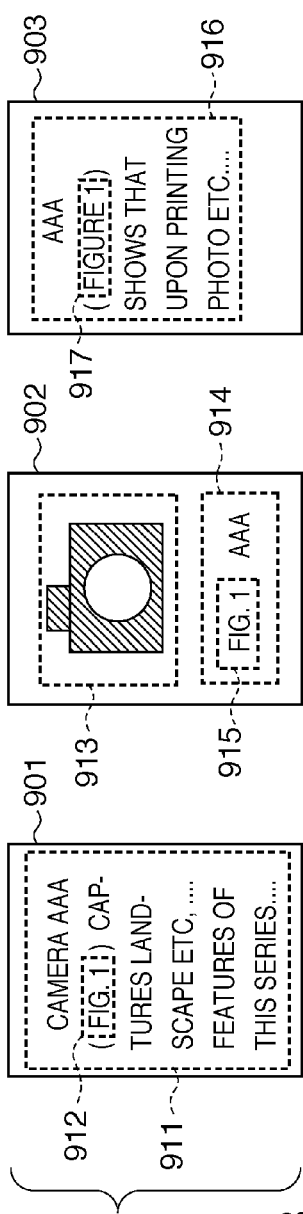

FIG. 11A

| FIGURE ID | COORDINATE X | COORDINATE Y | FIGURE WIDTH W | FIGURE HEIGHT H | PAGE | CHARACTER INFORMATION |
|---|---|---|---|---|---|---|
| 1101 | X1101 | Y1101 | W1101 | H1101 | 2 | FIG.1 AAA |

FIG. 11B

| TEXT ID | COORDINATE X | COORDINATE Y | WIDTH W | HEIGHT H | PAGE | CHARACTER INFORMATION |
|---|---|---|---|---|---|---|
| 1111 | X1111 | Y1111 | W1111 | H1111 | 1 | CAMERA AAA (FIG. 1) CAPTURES LANDSCAPE ETC,..... |
| 1112 | X1112 | Y1112 | W1112 | H1112 | 1 | FEATURES OF THIS SERIES..... |
| 1113 | X1113 | Y1113 | W1113 | H1113 | 3 | AAA (FIGURE 1) SHOWS THAT UPON PRINTING PHOTO ETC..... |

FIG. 12A

| PATTERN ID | CHARACTER PATTERN | ORIGINAL CHARACTER PATTERN |
|---|---|---|
| 1201 | Fig.1 | Fig.1 |
| 1202 | Fig,l | Fig.1 |
| 1203 | [Fig.] | Fig.1 |
| 1204 | Figure.1 | Fig.1 |
| 1205 | Figure,l | Fig.1 |
| 1206 | Figure.] | Fig.1 |

FIG. 12B

| SEARCH RESULT ID | CHARACTER PATTERN | ORIGINAL CHARACTER PATTERN | TEXT ID | POSITION IN TEXT |
|---|---|---|---|---|
| 1211 | Fig.1 | Fig.1 | 1111 | 8 |
| 1212 | Figure.1 | Fig.1 | 1113 | 5 |

FIG. 12C

| LINK ID | TYPE | LINK DESTINATION ID | ORIGINAL CHARACTER PATTERN | CHARACTER PATTERN | PAGE | CO-ORDINATE X | CO-ORDINATE Y | WIDTH W | HEIGHT H | ORDER |
|---|---|---|---|---|---|---|---|---|---|---|
| 1221 | ANCHOR TERM IN BODY | 1222 | Fig.1 | Fig.1 | 1 | X1111 | Y1111 | W1111 | H1111 | 1 |
| 1222 | FIGURE | 1221, 1223 | Fig.1 | Fig.1 | 2 | X1101 | Y1101 | W1101 | H1101 | |
| 1223 | ANCHOR TERM IN BODY | 1222 | Fig.1 | Figure.1 | 3 | X1113 | Y1113 | W1113 | H1113 | 2 |

FIG. 13

```
                                                              1300
        <x:function name ="init">
        function init ()
        {
1301⎧     var i, linkNum;
    ⎩     var link.Table =new Table ("LINK INFORMATION TABLE");
1302⎧     linkNum = lines(linkTable);
    ⎩     for (i = 0; i < linkNum; ++i)
        {
1303⎧       if (linkTable [i].TYPE.match("FIGURE")= TRUE)    1311
    ⎩       {
             makeLink(linkTable[i], LINK ID,
1304⎧            linkTable[i], ORIGINAL CHARACTER PATTERN,
             linkTable[i], PAGE,
             linkTable[i], COORDINATE X, linkTable[i], COORDINATE Y,
             linkTable[i], WIDTH W, linkTable[i], HEIGHT H,
    ⎩        (image) loadImage("FIGURE")
             (list)[(function) onClickAtFigure.(linkTable[i], LINK DESTINATION ID)]);
           }
1305⎧     else if (linkTable[i].TYPE.match("ANCHOR TERM IN BODY")= TRUE)
    ⎩     {
             var anchorArea;                                  1312
1306⎧        searchText(linkTable[i], CHARACTER PATTERN,
             linkTable[i], PAGE,
             linkTable[i], COORDINATE X, linkTable[i], COORDINATE Y,
             linkTable[i], WIDTH W, linkTable[i], HEIGHT H,
    ⎩        anchorArea);
             makeLink(linkTable[i], LINK ID
1307⎧          linkTable[i], ORIGINAL CHARACTER PATTERN,  1313
             linkTable[i], PAGE,
             searchArea.X, searchArea.Y,
             searchArea.W, searchArea.H,
             linkTable[i], LINK DESTINATION ID,
             (image) loadImage["ANCHOR TERM"],
    ⎩        (function) onClickAtAnchorText (linkTable[i], LINK DESTINATION ID));
           }
         }
        }
        </x:function>
```

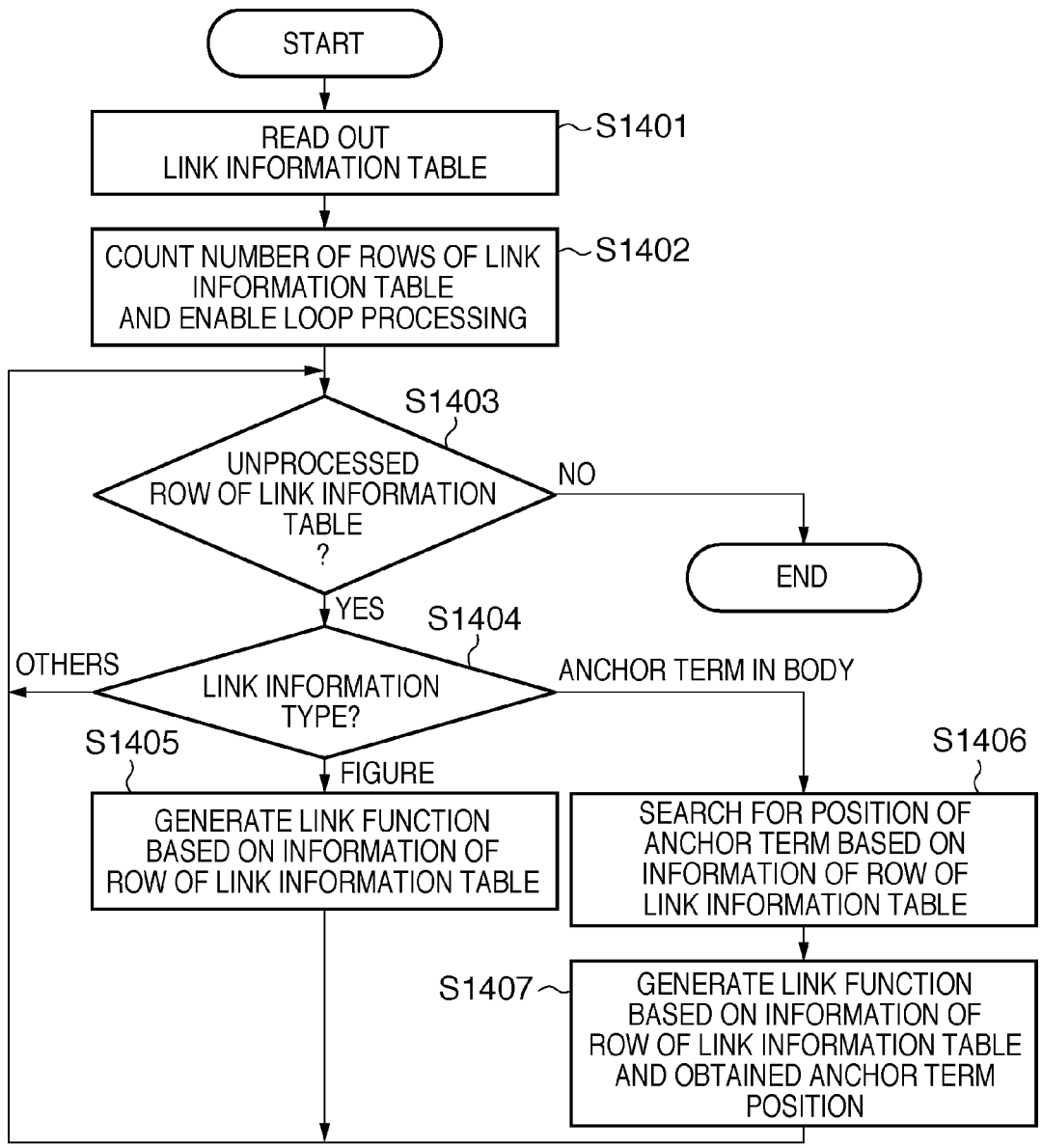

FIG. 15A

```
<g>
  <image x="X1101" y="Y1101" width="W1101" height="H1101"
    xlink:href="data:image/png;base64,Dez4563akdfsgiwkjblsdkjvoeri······."/>
  ......
</g>
<g x;field_id ="1222" ListNum="2">
  <rect x="X1501" y="Y1501" width="W1501" height="H1501"/>
  <function>
    onclick = onClickAtFigure(1221);
  </function>
  <function>
    onclick = onClickAtFigure(1223);
  </function>
</g>
```

```
<text x="X911" y="Y911" color="#000000">
  CAMERA AAA (FIG. 1) CAPTURES LANDSCAPE ETC, ....
</text>
<g x:field_id ="1221">
  <rect x="X13311" y="Y1331" width="W1331" height="H1331"/>
  <function>
    onclick =onClickAtAnchortext(1222);
  </function>
</g>
```

```
<x:function name="onClickAtFigure">
  function onClickAtFigure(field_id)
  {
    moveFocus(field_id);
    setField(field_id).color = setFocus;
  }
</x:function>
```

FIG. 15D

```
<x:function name="onClickAtAnchortext">
  function onClickAtAnchortext(field_id)
  {
    moveFocus(field_id);
    setField(field?id).color = setFocus;
    moveFocusField[getCallerField_id()];
  }
</x:function>
```

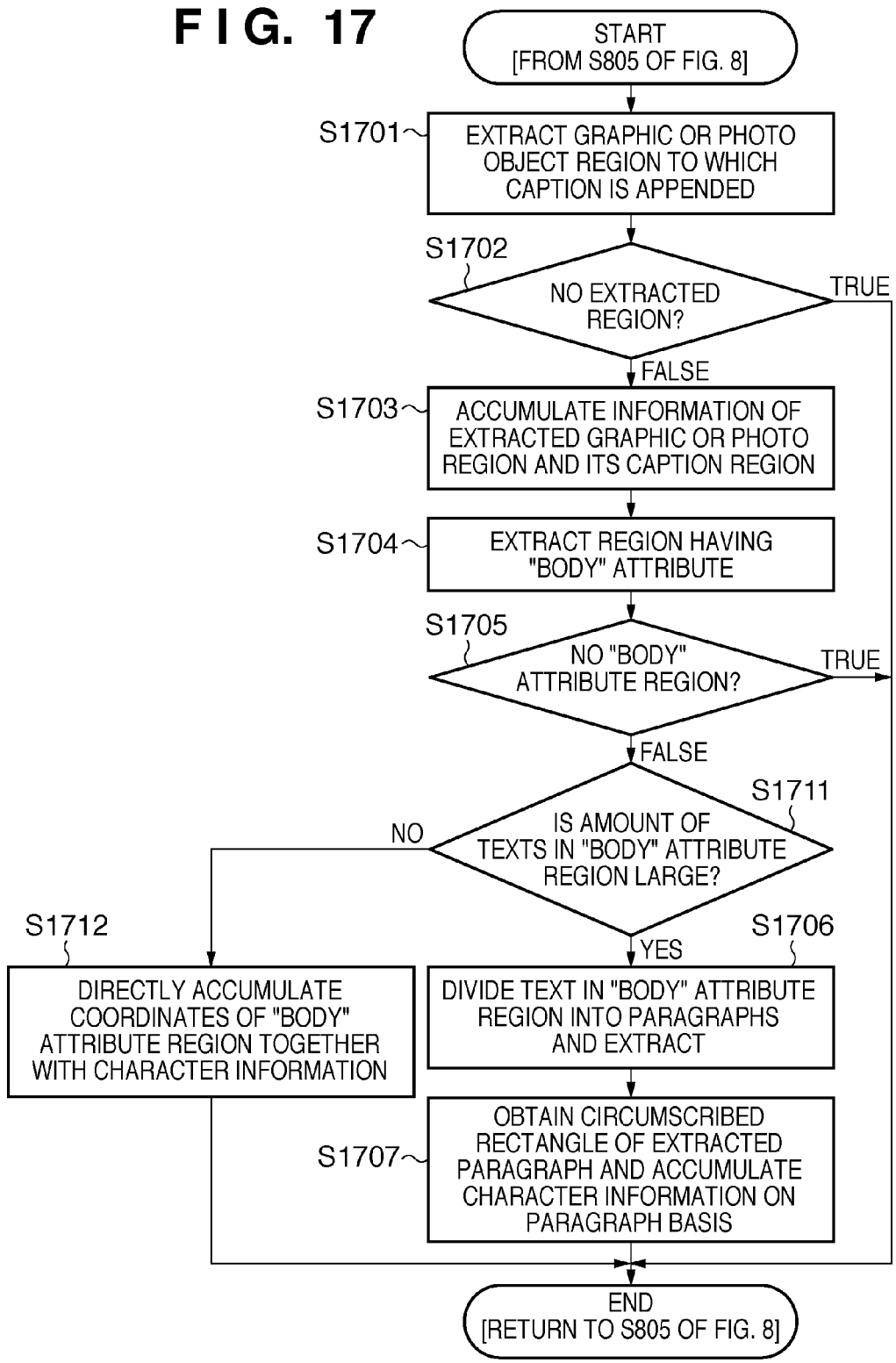

PROCESSING DOCUMENT IMAGE INCLUDING CAPTION REGION

BACKGROUND OF THE INVENTION

1. Field of the Invention

The present invention relates to an image processing apparatus for generating electronic document data capable of searching for an object from a document image, an image processing method, and a computer-readable medium.

2. Description of the Related Art

Conventionally, paper documents or electronic documents including "objects" (for example, photos, drawings, line drawings, and tables) and "object explanations" (texts that give explanations, commentaries, or the like on objects in bodies) in documents are widely used. The "object explanation" makes an explanation/commentary on the above-described "object" in the body that is the main text. A term such as "FIG. 1" is often used to associate them. The term that associates the "object" and the "object explanation" with each other, like "FIG. 1", is called an "anchor term". In addition, a caption region near the "object" often includes the "anchor term" and an explanation (to be referred to as a "caption term") that describes the object.

To extract only anchor terms from the body of, for example, an optically read paper document or an electronic document, advanced, heavy-load analysis using natural language processing and the like needs to be performed for all text information in the body. Such analysis processing requires to hold knowledge about how an anchor term occurs or is used in the body. For this reason, it is difficult to accurately extract the anchor terms from the enormous quantity of text information in the body, tending to make the process load much heavier. The extraction accuracy is very important because it greatly affects the accuracy of the object link function for associating an object and an object explanation with each other.

On the other hand, the number of characters written in the object captions is smaller than in the body. Hence, the anchor terms can more easily be obtained by analyzing the captions than by analyzing the body. When analyzing a document, anchor terms may be extracted first from object captions. Then, the document may be searched for body parts including the relevant anchor terms. To hold the information of all analyzed pages to generate an electronic document, the storage capacity needs to be enormous. To prevent this, when processing each page, only contents to be described in the electronic document of the page may be accumulated, and the remaining data may be discarded.

In the processing form mainly using such page-basis processing, a search is performed on the text of the document after the anchor terms are extracted from the objects. Processing of associating each object with the object explanation is executed after all pages have been processed. When processing each page, information about objects in the page and text information need to be extracted and accumulated as the contents to be described in the electronic document. After all pages have been processed, anchor term extraction and a text search in the document are performed, and the objects are associated with the object explanations based on the accumulated information (Japanese Patent Laid-Open No. 11-25113).

In the case in which the object link function is implemented to enable easy reference to the relationship between the above-described "object" and the "object explanation" in the above assumption, the operation components of the link function are arranged in the portions of the "object" and "object explanation" as the link function addition target, thereby adding the function that allows easy reference. The correspondence relationship between the object and the object explanation can be determined after the analysis of all pages of the document has ended. The link to the object is generated using the result.

However, if the accurate position of an anchor term that is the link function addition target in the text of the body cannot be recognized, the operation component cannot be arranged. In addition, before the anchor term search in the body has ended, the character portion in the text of the body corresponding to the anchor term in the explanation is unknown. Hence, it is also necessary to accumulate information representing the position and size of each character in the text information after the page-basis processing. This problem will be described with reference to FIGS. 1A and 1B. Document data 101 and 102 shown in FIG. 1A include a document body 111 and an anchor term 112 included in the explanation of the document. An object 113 that is a drawing in the document and a caption 114 of the object includes an anchor term 115 in the caption. Referring to FIG. 1B, a body 131 indicates part of the beginning of the body 111 in FIG. 1A. After the page-basis processing, information of the position and size of each character in it is accumulated. Hence, to accumulate the entire information of the positions and sizes of all characters in the document, a considerable large storage capacity (work memory) is required.

SUMMARY OF THE INVENTION

In consideration of the above-described contents, the present invention automatically generates electronic document data having a link function and decreases the resource necessary for the generation.

According to one aspect of the present invention, there is provided an image processing apparatus comprising: a region division unit configured to divide a document image into a body region, a caption region, and an object region to which the caption region is appended; a character information acquisition unit configured to acquire character information included in each of the body region and the caption region divided by the region division unit; an accumulation unit configured to divide the character information acquired from the body region into predetermined set units and to accumulate the character information and position information of the divided set unit in a memory; a page drawing data generation unit configured to generate page drawing data of the document image; an anchor term extraction unit configured to extract an anchor term from the character information acquired from the caption region; an anchor term search unit configured to search, based on the character information accumulated in the memory for each set unit, for the set unit including the anchor term extracted by the anchor term extraction unit; a link information generation unit configured to generate link generation information that associates the set unit found by the anchor term search unit with the object region to which the caption region including the anchor term is appended; a program generation unit configured to generate a program to be used to generate a link between the object region and the anchor term in the set unit based on the link generation information; and an electronic document data generation unit configured to generate electronic document data including the page drawing data generated by the page drawing data generation unit and the program generated by the program generation unit.

According to another aspect of the present invention, there is provided a method using a processor to perform the steps of: dividing a document image into a body region, a caption region, and an object region to which the caption region is appended; acquiring character information included in each of the body region and the caption region divided in the step of dividing the document image; dividing the character information acquired from the body region into predetermined set units and accumulating the character information and position information of the divided set unit in a memory; generating page drawing data of the document image; extracting an anchor term from the character information acquired from the caption region; searching, based on the character information accumulated in the memory for each set unit, for the set unit including the anchor term extracted in the step of extracting the anchor term; generating link generation information that associates the set unit found in the step of searching for the set unit with the object region to which the caption region including the anchor term is appended; generating a program to be used to generate a link between the object region and the anchor term in the set unit based on the link generation information; and generating electronic document data including the page drawing data generated in the step of generating the page drawing data and the program generated in the step of generating the program.

According to another aspect of the present invention, there is provided a non-transitory storage medium storing a computer program that causes a processor to perform the steps of: dividing a document image into a body region, a caption region, and an object region to which the caption region is appended; acquiring character information included in each of the body region and the caption region divided in the step of dividing the document image; dividing the character information acquired from the body region into predetermined set units and accumulating the character information and position information of the divided set unit in a memory; generating page drawing data of the document image; extracting an anchor term from the character information acquired from the caption region; searching, based on the character information accumulated in the memory for each set unit, for the set unit including the anchor term extracted in the step of extracting the anchor term; generating link generation information that associates the set unit found in the step of searching for the set unit with the object region to which the caption region including the anchor term is appended; generating a program to be used to generate a link between the object region and the anchor term in the set unit based on the link generation information; and generating electronic document data including the page drawing data generated in the step of generating the page drawing data and the program generated in the step of generating the program.

According to the present invention, it is possible to automatically generate the cross link between an "object" and an "object explanation" on a page basis and thus generate a multi-page electronic document. This facilitates reference and leads to user readability improvement.

It is unnecessary to hold all character positions in electronic document data, and the efficiency of electronic document data generation processing improves. This implements a decrease in the resource necessary for electronic document data generation. In addition, since complex processing is performed at the time of electronic document data generation by dividing processing, no delay in speed occurs when using electronic document data.

Further features of the present invention will become apparent from the following description of exemplary embodiments (with reference to the attached drawings).

BRIEF DESCRIPTION OF THE DRAWINGS

FIG. 7 is a view showing an example of the description of electronic document data corresponding to the input data;

FIGS. 9A, 9B, and 9C are views showing the results of region division and character recognition of input data;

FIGS. 11A and 11B are tables for explaining information accumulated by extraction processing;

FIGS. 12A, 12B, and 12C are tables showing the contents of information such as a dictionary and an extraction result;

FIG. 13 is a view showing an example of a generated program module;

FIGS. 14A and 14B are views showing processing of the program module;

FIGS. 15A, 15B, 15C, and 15D are views showing examples of descriptions corresponding to added link functions;

FIG. 17 is a flowchart illustrating processing according to the second embodiment.

DESCRIPTION OF THE EMBODIMENTS

First Embodiment

[System Arrangement]

Figure 2:
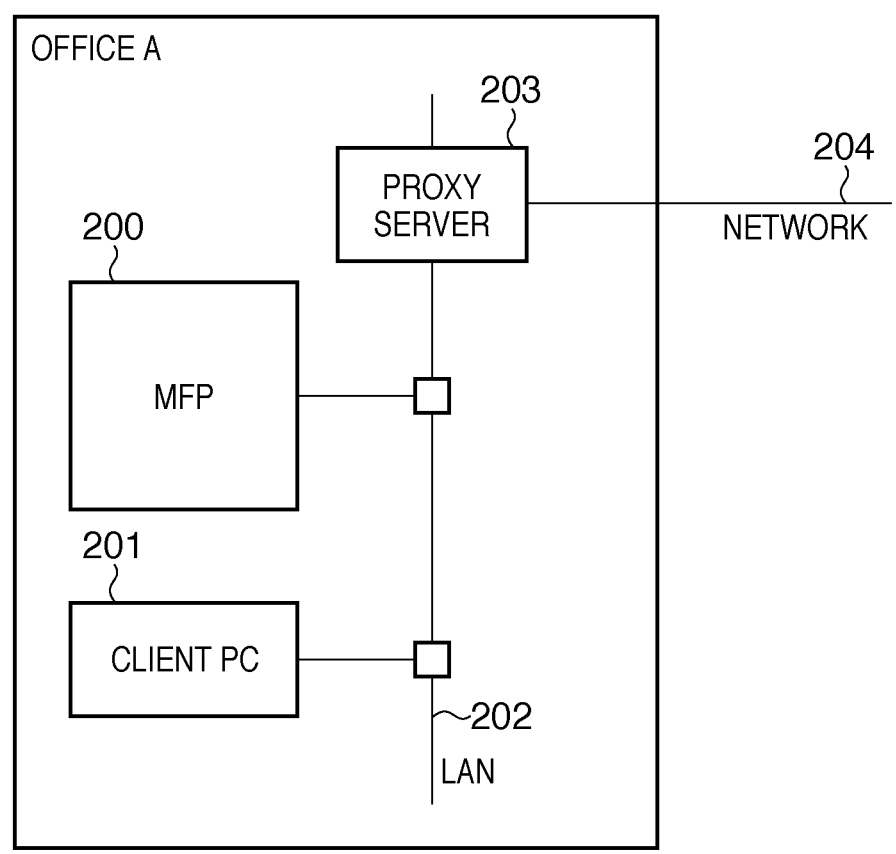
FIG. 2 is a block diagram showing an image processing system.

An embodiment for practicing the present invention will now be described with reference to the accompanying drawings. FIG. 2 is a block diagram showing the arrangement of an image processing system according to the embodiment. Referring to FIG. 2, a MFP (Multi Function Peripheral) 200 that implements a plurality of kinds of functions (for example, copy function, print function, and transmission function) is connected to a LAN 202 built in an office A. The LAN 202 is also connected to an external network 204 via a proxy server 203. A client PC 201 serving as an information processing apparatus receives data transmitted from the MFP 200 via the LAN 202 or uses the functions of the MFP 200. For example, the client PC 201 can transmit print data to the MFP 200 so that the MFP 200 creates a printed product based on the print data. Note that the arrangement shown in FIG. 2 is merely an example. A plurality of offices each having the same constituent elements as those of the office A may be connected to the network 204.

The network 204 is typically a communication network implemented by the Internet, a LAN, a WAN, a telephone network, a dedicated digital network, ATM, a frame relay network, a communication satellite network, a cable TV network, a wireless data broadcasting network, or the like. Any network capable of transmitting/receiving data is usable. Each of the various terminals such as the client PC 201 and the proxy server 203 has standard constituent elements provided on a general-purpose computer. Examples are a CPU, a RAM, a ROM, a hard disk, an external storage device, a network interface, a display, a keyboard, and a mouse.

[Detailed Arrangement of MFP]

Figure 3:
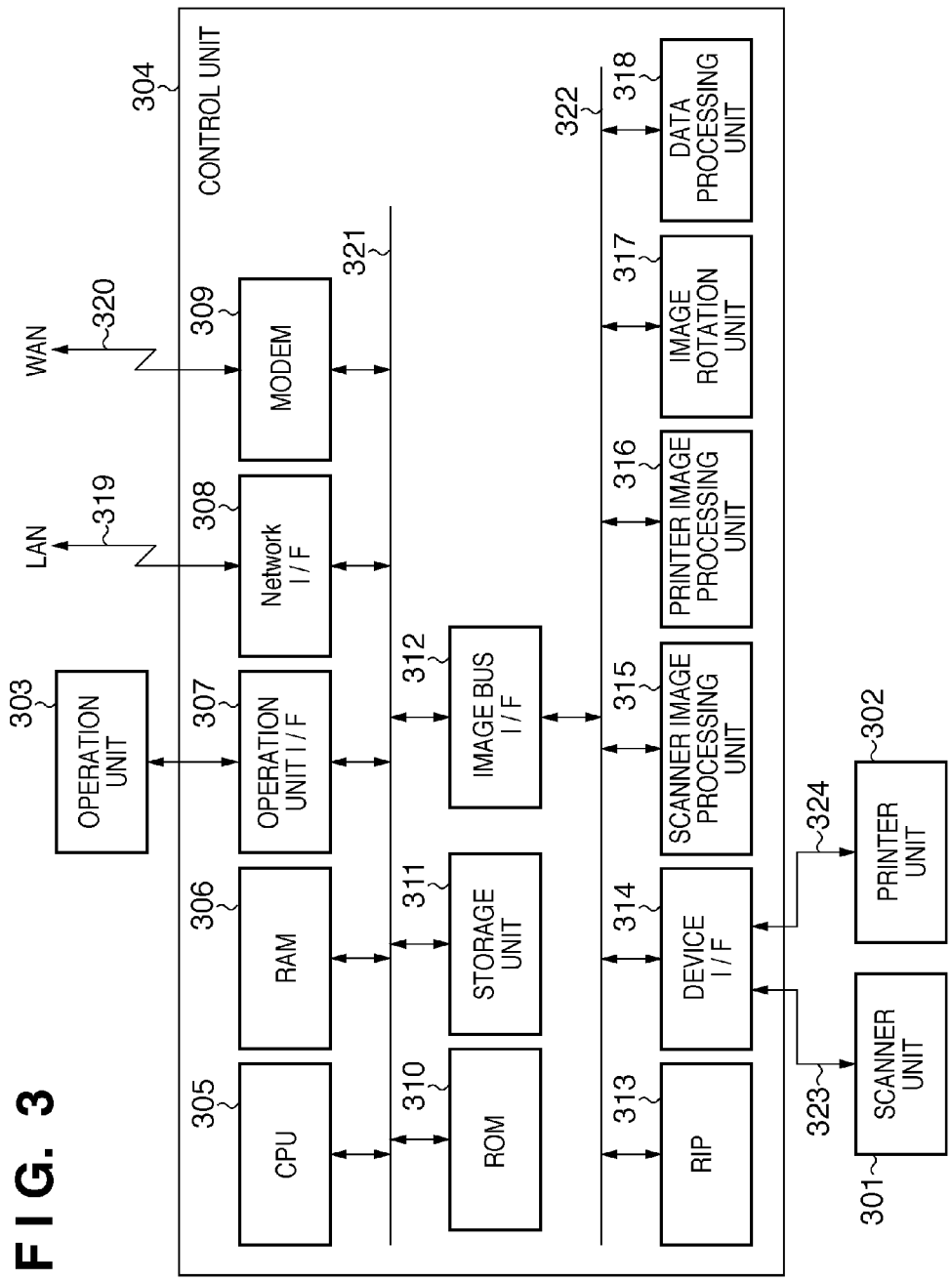
FIG. 3 is a block diagram showing the arrangement of an MFP.

FIG. 3 is a block diagram showing the detailed arrangement of the MFP 200 serving as an image processing apparatus according to the embodiment. Referring to FIG. 3, the MFP 200 includes a scanner unit 301 serving as an image input device, a printer unit 302 serving as an image output device, a control unit 304 formed from a CPU 305 and the like, and an operation unit 303 serving as a user interface. The control unit 304 is a controller that is connected to the scanner unit 301, the printer unit 302, and the operation unit 303 and also connected to a LAN 319 and a public network (WAN) 320 formed from a general telephone network so as to input/output image information and device information.

The CPU 305 controls the units included in the control unit 304. A RAM 306 serves as a system work memory to be used by the CPU 305 to operate and also serves as an image memory to temporarily store image data. A ROM 310 is a boot ROM that stores programs such as the boot program of the system. A storage unit 311 is a hard disk drive that stores system control software and image data. An operation unit I/F 307 is the interface unit to the operation unit (UI) 303 and outputs, to the operation unit 303, image data to be displayed on it. The operation unit I/F 307 also has a function of transmitting, to the CPU 305, information input via the operation unit 303 by the user of the image processing apparatus. A network I/F 308 connects the image processing apparatus to the LAN 319 to input/output information in the packet format. A modem 309 connects the image processing apparatus to the WAN 320 to input/output information by demodulating/modulating data. The above-described devices are arranged on a system bus 321.

An image bus I/F 312 serves as a bus bridge that is connected to the system bus 321 and an image bus 322 for transferring image data at a high speed so as to convert the data structure. The image bus 322 is formed from, for example, a PCI bus or IEEE1394. The following devices are arranged on the image bus 322. A raster image processor (RIP) 313 implements the so-called rendering by analyzing PDL (Page Description Language) codes and bitmapping them at a designated resolution. When bitmapping, attribute information is added to each pixel or each region. This is called image area determination processing. With the image area determination processing, attribute information representing an object type such as character (text), line, graphics, or image is added to each pixel or each region.

For example, the RIP 313 outputs an image area signal in accordance with the object type described by the PDL in the PDL codes. Attribute information corresponding to the attribute represented by the signal value is stored in association with a pixel or a region corresponding to the object. Hence, image data is accompanied by associated attribute information. A device I/F 314 connects the control unit 304 to the scanner unit 301 serving as the image input device via a signal line 323 and the printer unit 302 serving as the image output device via a signal line 324 to convert image data synchronous system/asynchronous system. A scanner image processing unit 315 corrects, manipulates, and edits input image data. A printer image processing unit 316 performs correction, resolution conversion, and the like complying with the printer unit 302 for print output image data to be output to the printer unit 302. An image rotation unit 317 rotates input image data to a correct position and outputs it. A data processing unit 318 will be described later.

[Detailed Arrangement of Data Processing Unit]

The data processing unit 318 in FIG. 3 will be described next in detail with reference to FIG. 4. The data processing unit 318 includes a region division unit 401, an attribute information addition unit 402, a character recognition unit 403, a link processing unit 404, and a format conversion unit 405. Upon receiving image data 400 scanned by the scanner unit 301, the data processing unit 318 causes the processing units 401 to 405 to process it and thus generates and outputs electronic document data 410.

Image data scanned by the scanner unit 301 in FIG. 3 or image data (document image data) stored in the storage unit 311 is input to the region division unit 401. To extract the regions (object regions) of objects such as characters, photos, drawings, and tables arranged in the page, the region division unit 401 performs processing such pixel extraction and grouping in the data.

A known method is used as the region extraction method (region division method) at this time. An example will be described. First, an input image is binarized to generate a binary image. The resolution of the binary image is lowered to generate a thinned image (reduced image). For example, to generate an image thinned out to 1/(M×N), the binary image is divided into M×N pixel regions. If the M×N pixels include a black pixel, the corresponding pixel after reduction is replaced with a black pixel. Otherwise, the corresponding pixel is replaced with a white pixel, thereby generating a thinned image.

Next, portions (concatenated black pixels) where black pixels are concatenated are extracted from the thinned image. The circumscribed rectangle of the concatenated black pixels is generated. Assume that rectangles (one-character rectangles) nearly in the character image size are arranged in a line, or a rectangle (a rectangle of concatenated black pixels that form several characters connected) has a vertical or horizontal size almost equal to the character image size and has a similar rectangle near its short side. It is highly probable that the portion is a character image included in one character row. In this case, the rectangles are connected to obtain a rectangle representing one character row. When rectangles each representing one character row have almost the same short side length and are arranged at almost equal intervals in the column direction, it is highly probable that the set of rectangles is a body part. Hence, a region of the connected rectangles is further extracted. A photo region, a graphic region, or a table region is extracted as a region of concatenated black pixels larger than the character image.

The attribute information addition unit 402 adds an attribute to each region divided by the region division unit 401. This processing operation will be described using an example of input image data shown in FIG. 6A. A region 606 includes a plurality of characters and rows in the page. The region is collectively determined from its form of characters, rows, paragraphs, and the like and added with the attribute "body" (body region). For each remaining region, it is determined first whether the region includes a rectangle nearly in the character image size. Especially, in a region including character images, the rectangles of the character images periodically appear in the region. For this reason, it is possible to determine whether a region includes a character. As a result, regions 601, 604, and 605 are determined to be regions including characters so that the attribute "character region" is added. However, these regions do not have the form of characters, rows, paragraphs, and the like and are therefore not added with the attribute "body".

Other regions are determined as "noise" if the region size is very small. For concatenated black pixels having a low pixel density, white pixel outlines in that region are tracked. If the circumscribed rectangles of the white pixel outlines are arranged in order, the region is determined as "table". If the rectangles are not arranged in order, the region is determined as "graphic" (for example, line drawing). Other regions having a high pixel density are determined as a picture or a photo, and the attribute "photo" is added. Note that the above-described attribute classification method is merely an example, and the present invention is not limited to this.

For a character region (a region having the attribute "character region") determined not to be the body (the attribute "body" is not added), it is determined whether it exists near (above or under) an object region added with "table", "graphic", or "photo". The character region existing near (above or under) an object region added with "table", "graphic", or "photo" is determined to be a character region that explains the "table", "graphic", or "photo" region, and added with the attribute "caption". That is, the region having the attribute "caption" is determined based on the predefined positional relationship between the "character region" and the "table", "graphic", or "photo" region. Note that the region added with the attribute "caption" is stored while associating the caption region with the object region to which the caption region is appended so that the region ("table", "graphic", or "photo") to which the caption region is appended can be specified.

If a region out of the regions determined to be "character regions" is larger than the character image in the "body" attribute region and exists at a position different from the column of the "body" attribute region, the attribute "title" is added. If a character region is larger than the character image in the "body" attribute region and exists above the column of the "body" attribute region, "subtitle" is added as the attribute. If a character image has a size equal to or smaller than the character image size in the "body" attribute region and exists at the bottom or top of the document, the attribute "page" (or "page header" or "page footer") is added. When a region is determined to be "character region", and none of "body", "title", "subtitle", "caption", and "page" applies to the region in the subsequent determination, the attribute "character" is added. Determination to add a more detailed attribute to a region having the "character region" attribute is not limited to the above-described method. For example, a region having an anchor term in the region having the "character region" attribute may be determined as "caption". The attribute determination order may be changed. The priority order of the attribute to be added may be changed.

Figures 6A, 6B:
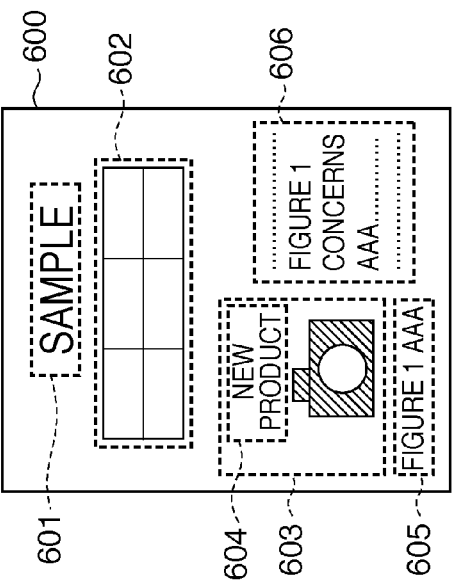
FIGS. 6A, 6B, 6C, and 6D are views showing the results of region division and character recognition of input data.

When the above-described attribute information addition processing by the attribute information addition unit 402 is performed, the attribute "title" is added to the region 601 in the example of FIG. 6A, "table" to a region 602, "photo" to a region 603, "character" to the region 604, "caption" to a region 605 appended to the region 603, and "body" to the region 606.

The character recognition unit 403 executes known character recognition processing for regions including character images (the regions having the attributes "character", "body", "title", "subtitle", and "caption"). Resultant character code sequences are stored as character information and associated with the target regions.

The information of the position, size, and region attribute of each region, the page information, and the character information (character code information) of the character recognition result thus extracted by the region division unit 401, the attribute information addition unit 402, and the character recognition unit 403 are stored in the storage unit 311 shown in FIG. 3. FIG. 6B shows an example of information (region information) stored in the storage unit 311 in FIG. 3 when the input image data example shown in FIG. 6A has been processed. For the region 604, since it is a "character" region included in the region 603 having the attribute "photo" or "graphic", information "in 603" is added, as indicated by the object ID 604 in FIG. 6B.

The link processing unit 404 generates information necessary for generating a link between an object (for example, "table", "graphic", or "photo": to be referred to as a caption-appended object hereinafter) to which a region having the "caption" attribute detected by the attribute information addition unit 402 and an "explanation term in the body", and stores the information in the storage unit 311. The link processing unit 404 will be described later in detail.

The format conversion unit 405 uses the input image data 400 and information (for example, page information, the position, size, and attribute of each region, character information, and metadata) obtained by the region division unit 401, the attribute information addition unit 402, the character recognition unit 403, and the link processing unit 404. Based on these pieces of information, the format conversion unit 405 generates the electronic document data 410 in a predetermined electronic document format (for example, PDF, SVG, XPS, or Office Open XML) for output. An electronic document data generation unit is thus implemented. The electronic document data generated by the format conversion unit 405 includes page display information (for example, display image) by graphics and the like and content information (for example, metadata) by the semantic description of characters and the like.

The processing of the format conversion unit 405 is roughly divided into two steps. First, filter processes such as flattening, smoothing, edge emphasis, color quantization, and binarization are performed for each image region (a region having the attribute "table", "graphic", or "photo"). Then, the image data (for example, an image corresponding to a region added with the "graphic" attribute) is converted into a format so as to be stored in electronic document data having a predetermined electronic document format. Actually, the image data is converted into graphics data (vector data) by a vector path description or graphics data (for example, JPEG data) by a bitmap description. A known vectorization technique can be used for conversion to vector data. A graphics description (vector path description) such as a frame to be displayed to specify or highlight a search result upon an object search can also be generated. Based on this data, electronic document data having a predetermined electronic document format is generated from the region information (position, size, and attribute) stored in the storage unit 311 and the character information in the region.

Figures 6C, 6D:
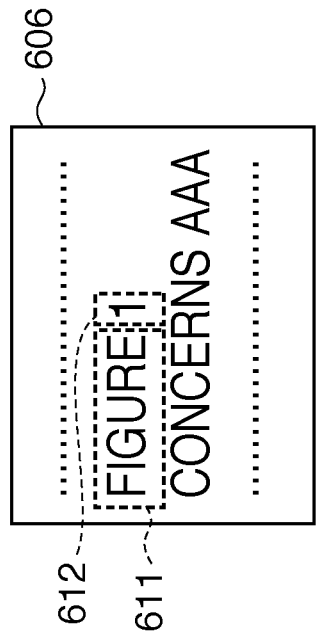

In particular, the character region undergoes image cutout processing by binarization and pixel erase processing for the image data 400 so as to extract character codes as the character recognition result and its position information. FIGS. 6C and 6D show information (character information) obtained from the region 606 in FIG. 6A. As for the character "Figure" in a region 611, its character code (C611) and the x and y coordinate values of the upper left corner and the lower right corner are obtained. Similar information can be acquired for the character "1" in a region 612. To impart the cross link function, the user is allowed to select, on the text term (anchor term) that specifies the object, the operation of directly transiting to the object represented by the text term.

Figure 1A:
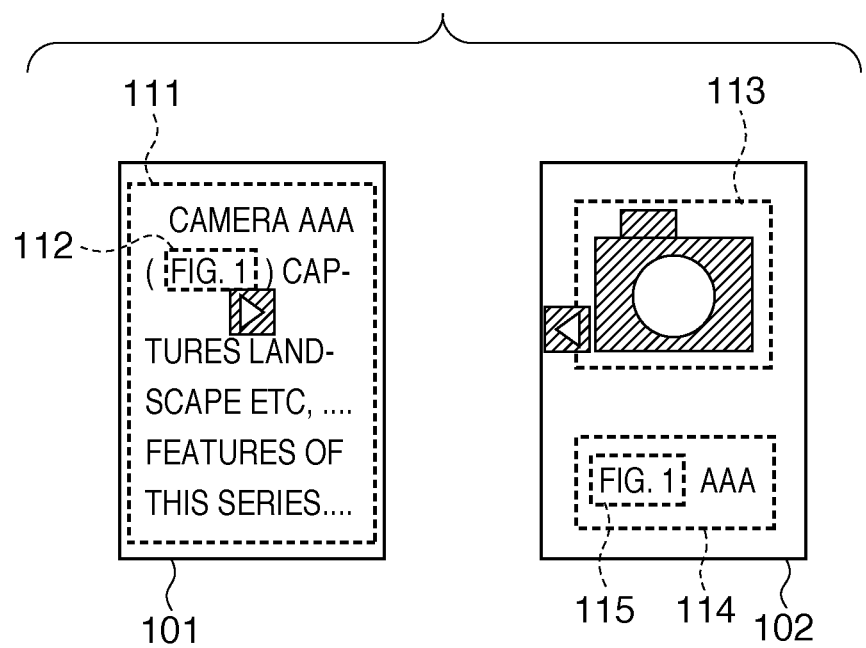
FIGS. 1A and 1B are views for explaining the background art and its problem.
Figure 1B:
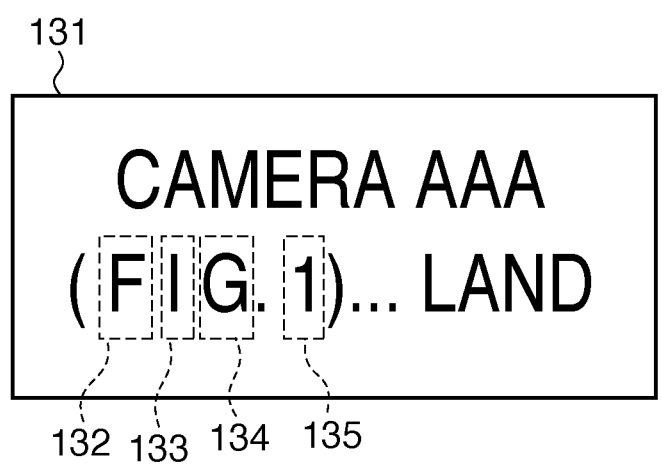

To add a display for allowing the operation selection to the text term portion, it is necessary to accurately obtain the circumscribed rectangle of the character string "Figure 1". For this purpose, the position information of each character is accumulated usually. In the present invention, however, a unique method is used for the accumulation. The accumulation method will be described later.

[Example of Structure of Generated Electronic Document Data]

FIG. 7 shows an example of the electronic document data 410 generated here. In the example of FIG. 7, the data is described in the SVG (Scalable Vector Graphics) format based on the data (region information) shown in FIG. 6B which is stored in the storage unit 311 in FIG. 3 upon processing image data 600 in FIG. 6A. Descriptions 701 to 706 in FIG. 7 are graphics descriptions corresponding to the regions 601 to 606 in FIG. 6A, respectively. The descriptions 701, 704, 705, and 706 are examples of character drawing descriptions using character codes. The description 702 is an example of the vector path description of the vector-converted table frame corresponding to the region 602 (omitted because of low relevance in this explanation). The description 703 is an example of the description used to paste a cutout photo image. The descriptions 701 to 707 are those in one page. Descriptions 711 and 712 delimit those of individual pages. Descriptions 713 to 717 concerning the entire electronic document are not graphics descriptions.

The electronic document according to the present invention allows to add an operation function and the like using a simple functional programming language. Examples are the descriptions 714 and 716. The description 716 indicates that when using the electronic document, a program module (function) named "init" is invoked and processed, as will be described later in detail. Additionally, in the description 716, processing to be executed in "init" is described in the above-described functional programming language (a detailed description is omitted here). These descriptions will be explained not here but later in detail.

Note that although SVG has been exemplified here, the output format is not limited to SVG, and the data can be converted into PDF, XPS, Office Open XML, or any other PDL-based data format.

[Link Processing Unit]

Figure 5:
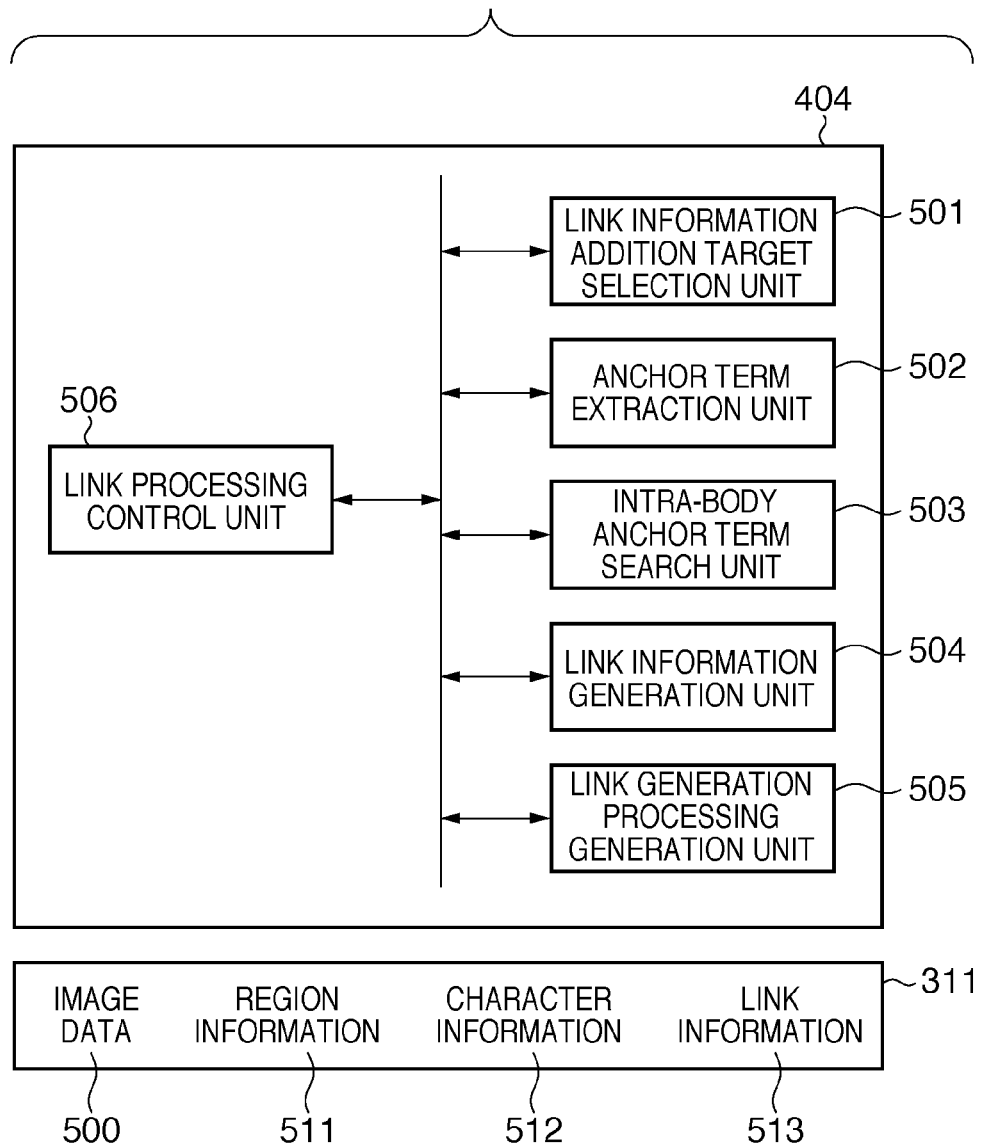
FIG. 5 is a block diagram showing an example of the arrangement of a link processing unit.

FIG. 5 is a block diagram showing an example of the arrangement of the link processing unit 404. The processing contents of each constituent element included in the link processing unit 404 will be described below. A link information addition target selection unit 501 selects a caption-appended object (graphic or photo region) and the character information of a "caption" region associated with the caption-appended object as the link information generation target in input image data.

An anchor term extraction unit 502 analyzes the character information of the "caption" region associated with the caption-appended object selected by the link information addition target selection unit 501 to extract an anchor term. That is, the character information included in the "caption" region is analyzed to search for an anchor term (for example, "Figure 1" or "FIG. 1"). When an anchor term is found in the analyzed character information, this portion is extracted as an "anchor term", and the remaining portion is extracted as a "caption term".

The anchor term extraction unit 502 also has a function of excluding insignificant character strings (for example, meaningless symbol strings) by including character code properties, dictionaries, and the like. This copes with, for example, character misrecognition that occurs when an ornament, parting line, or image appearing at a text portion boundary in a document is interpreted as a character. To extract an anchor term, character string patterns of figure numbers and the like in many languages and character misrecognition patterns corresponding to them are held, thereby achieving a high anchor term extraction accuracy and character correction of anchor terms. This also applies to a caption term. That is, it is possible to perform analysis by natural language processing and character misrecognition correction and also impart a function of correcting and excluding a symbol or character ornament appearing at the boundary to an anchor term or at the top/end.

An intra-body anchor term search unit 503 searches the "body" region of the document data for the anchor term (for example, "Figure 1" or "FIG. 1") extracted in the anchor term extraction processing by the anchor term extraction unit 502. The intra-body anchor term search unit 503 then extracts it as the anchor term in the "body" region corresponding to the caption-appended object. The explanation term in the "body" region, which includes the anchor term and explains the caption-appended object, is thus extracted as an explanation term candidate of the caption-appended object. A search index can be generated for a faster search. Note that the index generation and the high-speed search using the index can be done by known index generation and search techniques. The structure of the search index depends on the known technique to be used. The search speed can be more effectively increased by a batch search using a specific character string of a plurality of anchor terms. For the explanation term in the "body" region as well, it is possible to hold character string patterns of figure numbers and the like in many languages, character patterns of spelling fluctuations of figure numbers and the like, and character misrecognition patterns corresponding to them. Executing fuzzy reference using these patterns makes it possible to improve the search accuracy and provide the correction function. The anchor term extraction unit 502 and the intra-body anchor term search unit 503 implement an anchor extraction unit.

A link information generation unit 504 generates information (to be referred to as link information hereinafter) necessary for generating a link between the caption-appended object (for example, an object such as a graphic or a photo) selected by the link information addition target selection unit 501 and the anchor term in the "body" region searched and extracted by the intra-body anchor term search unit 503. To generate the link information, information representing positions in the document image where the link is to be added and the relationship thereof is necessary. In the present invention, when obtaining position information of anchor terms, pieces of position information are put together for a predetermined set unit such as a paragraph (that is, the circumscribed rectangle of a plurality of characters is obtained) and accumulated, instead of directly storing the position information of each character.

A link generation processing generation unit 505 generates a program module that causes the computer to execute processing of actually generating a link, and then adds it to the electronic document data together with the position information accumulated by the link information generation unit 504 and other information. When using the electronic document data 410, each processing described in the programming language dynamically generates a link based on the stored information so that the user can use the link function. This will be described later in detail. Information to be used to generate a link between a graphic or a photo and an anchor term described in the body is generated here. Note that in this embodiment, electronic document data before information such as a program module is added and will be referred to as "page drawing data" hereinafter for the descriptive convenience. On the other hand, data added with the information such as a program module by the format conversion unit 405 will be referred to as "electronic document data (or electronic document data 410)".

Using the link information accumulated by the link information generation unit 504, the link generation processing generation unit 505 generates a program description for link processing, information necessary for link generation, and the like in accordance with the description format of the electronic document data 410 and the specifications of the programming language. The programming language description for link processing and the information necessary for link generation are generated based on a predetermined link trigger or link action setting. Finally, what the link generation processing generation unit 505 has generated is transferred to the format conversion unit 405 in FIG. 4 and added to the page drawing data.

Note that the operations of the units (the processing units 501 to 505 in FIG. 5) of the link processing unit 404 will be described later in more detail using actual processing. In the processing of each flowchart to be described below, the storage unit 311 stores image data 500, region information 511, character information 512, link information 513, and the like.

[Processing Procedure (Outline)]

Figure 8:
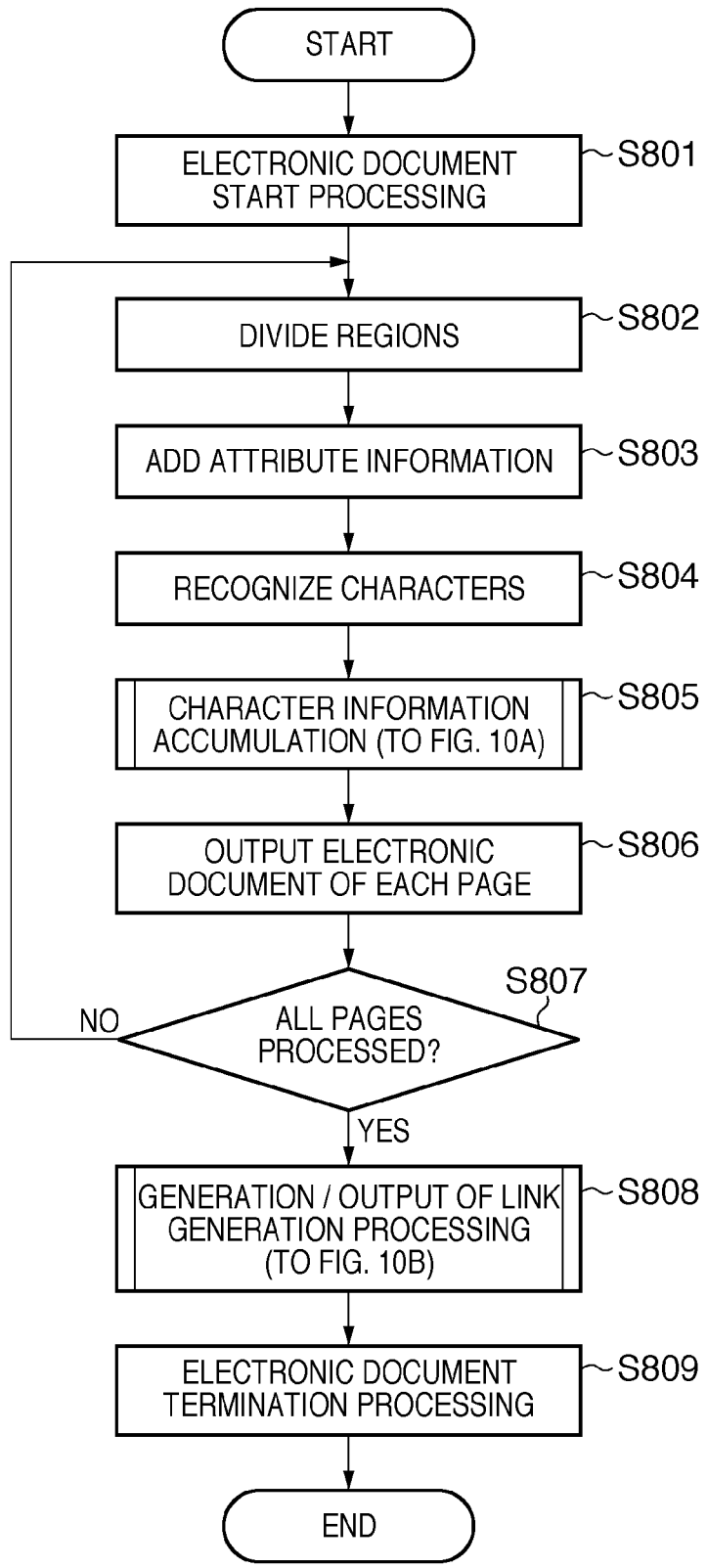
FIG. 8 is a flowchart for explaining the outline of processing.

The outline of overall processing to be executed by the image processing system according to this embodiment will be described next with reference to the flowchart of FIG. 8. The flowcharts shown in FIGS. 8 and 10 are executed by the data processing unit 318 in FIG. 3 (the processing units 401 to 405 in FIG. 4). Note that in this embodiment, the CPU 305 in FIG. 3 functions as the data processing unit 318 (the processing units 401 to 405 in FIG. 4) by reading out and executing the computer programs stored in the storage unit 311 (computer-readable storage medium). However, the present invention is not limited to this. For example, the data processing unit 318 in FIG. 3 (the processing units 401 to 405 in FIG. 4) may be implemented by hardware such as an electronic circuit.

FIG. 8 is a flowchart of processing of converting the image data 400 of a plurality of pages input to the MFP 200 shown in FIG. 2 into the electronic document data 410 of a plurality of pages. Note that as the image data of a plurality of pages, for example, image data of three pages shown in FIG. 9A is input. The flowchart of FIG. 8 will be described below.

Figure 4:
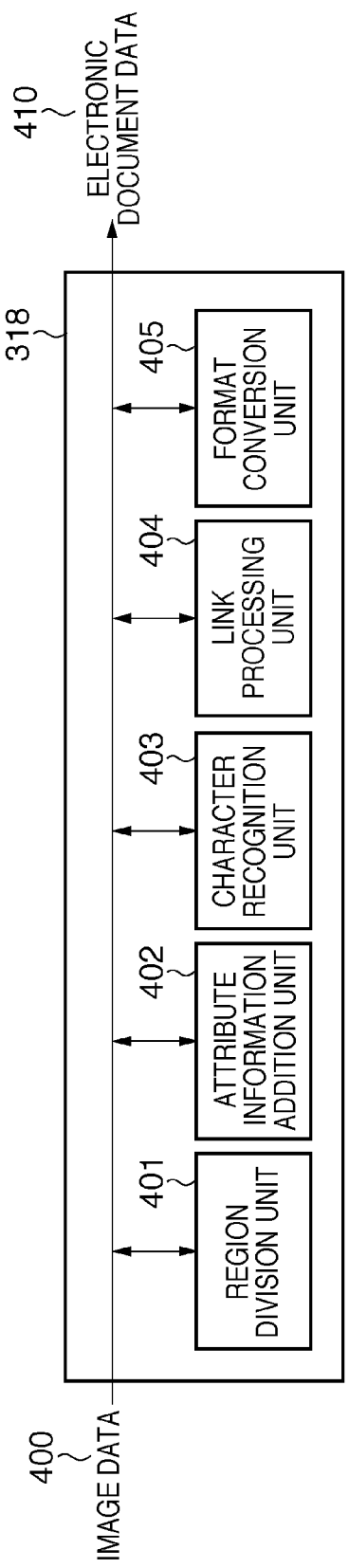
FIG. 4 is a block diagram showing an example of the arrangement of a data processing unit.

When the processing starts, the CPU performs, in step S801, initialization for subsequent processing and preprocessing to cause the format conversion unit 405 in FIG. 4 to generate the electronic document data 410. In step S802, the region division unit 401 extracts regions from the input image data of one page. For example, pieces of information shown in FIG. 9B are extracted from image data 901 (first page) to 903 (third page) shown in FIG. 9A. The structures are the same as those described with reference to FIGS. 6A and 6B.

In step S803, the attribute information addition unit 402 adds attributes to the regions divided in step S801. In the example of the second page (image data 902) shown in FIG. 9A, the attribute "photo" is added to a region 913, and the attribute "caption" is added to a region 914. The region 914 is also added with information representing that it is appended to the region 913. In step S804, the character recognition unit 403 executes character recognition processing for the regions added with the attribute "character region" (for example, the attributes "body", "caption", "title", and "subtitle") in step S802, and holds the results as character information in association with the target regions. The results are shown in the cells of the item "character information" in FIG. 9B. In addition, the information of each character is extracted, as shown in FIG. 6D. and FIG. 9C.

In step S805, the link processing unit 404 extracts and accumulates information necessary for link generation. The processing to be executed by the link processing unit 404 in step S805 will be described later in detail with reference to the flowchart of FIG. 10A. When this processing ends, the process advances to step S806.

In step S806, the format conversion unit 405 performs graphic data generation and the like based on the image data 400 and the information generated in step S805 and stored in the storage unit 311 as shown in FIG. 11B, thereby generating, for each page, page drawing data in a predetermined electronic document format. A page drawing data generation unit is thus implemented. In step S807, the data processing unit 318 determines whether the information extraction processing in steps S801 to S806 has been done for al pages. If all pages have been processed (YES in step S807), the process advances to step S808. If an unprocessed page remains (NO in step S807), the processing from step S802 is repeated.

In step S808, the link processing unit 404 in FIG. 4 extracts an anchor term and information for link generation and transfers them to the format conversion unit 405 together with data for link generation processing described in a predetermined programming language. The format conversion unit 405 adds the received information to the page drawing data. The processing to be executed by the link processing unit 404 in step S808 will be described later in detail with reference to the flowchart of FIG. 10B. When this processing ends, the process advances to step S809. In step S809, the CPU performs termination processing. More specifically, the format conversion unit 405 generates information to terminate generation of the electronic document data 410. Then, the processing procedure ends.

FIG. 9B shows examples of position and size information, page information, region attributes, and region character information of the extracted regions, which are results obtained by performing the processing in steps S801 to S809 for the image data 901 to 903 of three pages shown in FIG. 9A. These pieces of information are stored in the storage unit 311.

The outline of the processing according to the embodiment has been described above. However, the above-described processing merely aims at a general document image. Hence, the order and details of processing may be changed as far as it is performed to implement the object link function of the present invention. For example, character recognition with character misrecognition correction may be performed by applying natural language processing and dictionaries. Information may be extracted and used using specific terms. Alternatively, each analysis method may be optimized by, for example, categorizing document styles or document contents. Information of an object, for example, contents may be extracted using a technique such as image recognition. The input document image may be described using a page description language or the like. As described above, various changes and modifications are possible as long as the processing uses the body text and the caption terms and anchor terms of objects to implement the object link function of the present invention.

[Processing Procedure of Link Processing Unit (Object Information Accumulation)]

Details of the processing in step S805 of FIG. 8 will be described next with reference to FIG. 10A. This processing is performed by the units in the link processing unit 404. Information is accumulated so as to extract information of the correspondence relationship between an anchor term and an object corresponding to the anchor term, which is necessary for link generation. In this processing, the analysis result obtained by the processing in steps S802 to S804 of FIG. 8 is accumulated while saving the storage capacity. This is one of the features (points) of the present invention.

In step S1001, the link information addition target selection unit 501 in the link processing unit 404 extracts, out of regions having the attributes "graphic" and "photo" of the region information 511 stored in the storage unit 311, a region (corresponding to a caption-appended object) to which a region having the attribute "caption" is appended. In the example shown in FIG. 9A, an object ID 913 ("photo" attribute) is extracted by referring to the item "caption-appended object ID" in FIG. 9B. In step S1002, a link processing control unit 506 checks whether a region extracted in step S1001 exists, and causes a conditional branch based on the result. If there is no caption-appended object region (TRUE in step S1002), the processing of FIG. 10A ends. If there is a caption-appended object region (FALSE in step S1002), the process advances to step S1003.

In step S1003, the link information addition target selection unit 501 accumulates, in the storage unit 311, the information of the caption-appended object extracted in step S1001 as the link information 513. At this time, the pieces of information of the characters and character coordinates of the "caption" region appended to the caption-appended object, which are stored as the character information 512, are also accumulated. Note that these pieces of information are accumulated in a format easy to use in the following processing.

The processing of step S1003 will be described in detail using the example of FIG. 9A. FIG. 11A shows information after the processing of step S1003 has been applied to the object region having the "graphic" or "photo" attribute to which the region having the "caption" attribute is appended. For example, a figure ID 1101 in FIG. 11A indicates the photo portion of the region 913 in FIG. 9A. A figure ID for accumulation is reassigned as a management number. The pieces of information of the coordinates, width, and height of the figure have values based on the information of the region 913 in FIG. 9B. Note that since these values are used as the position and size of a link operation portion later, they are reset to be slightly larger than those of the region 913 in FIG. 9B and stored. The values to be reset may be defined in accordance with the size of the object or fixed to specific values. In addition, the character information of the region 914 in FIG. 9A, which represents the caption of the figure ID 1101 (region 913), is stored in the item "character information" of the figure ID 1101. As described above concerning the example, in step S1003, the link information addition target selection unit 501 accumulates, as the link information 513, information obtained by processing the information of the region having the "graphic" or "photo" attribute for accumulation, as shown in FIG. 11A.

In step S1004, the link information addition target selection unit 501 extracts the information of the region having the "body" attribute from the region information 511 stored in the storage unit 311. In the example of FIG. 9A, the pieces of character information of the body regions with the object IDs 911 and 916 are selected. In step S1005, the link processing control unit 506 determines whether the information of a region having the "body" attribute has been extracted in step S1004, and causes a conditional branch based on the result. If no region having the "body" attribute has been extracted (TRUE in step S1005), the processing of FIG. 10A ends. If a region having the "body" attribute has been extracted (FALSE in step S1005), the process advances to step S1006.

In step S1006, the link information addition target selection unit 501 divides the character information of the body extracted in step S1004 for each paragraph and extracts the information. In step S1007, the link information addition target selection unit 501 accumulates the character information of each paragraph extracted in step S1006 in the storage unit (memory) 311 as the link information 513. At this time, position information is also accumulated for each divided paragraph. Note that these pieces of information are accumulated in a format easy to use in the following processing.

Steps S1006 and S1007 will be described in detail using the example of image data shown in FIG. 9A. FIG. 11B shows the position information of regions having character information to be used when searching for an anchor term. On the other hand, the character recognition unit 403 extracts the position information of each character in step S804, as shown in FIGS. 6C and 6D. For example, in the image shown in FIG. 9A, pieces of position information for the regions having the "body" attribute in FIG. 9B, that is, the regions 911 and 916 in FIG. 9B are accumulated based on the position information of each character extracted by the character recognition unit. In step S1006, the characters are divided for each paragraph based on the position information of each character, for example, how the characters are arranged. In step S1007, the position information is recorded for each divided paragraph. When the position information of each character is stored/accumulated, as shown in FIG. 6D or 9C, the storage capacity (work space memory) for this need to be enormous. To save the storage capacity, the position information is stored/accumulated for each predetermined set unit, as shown in FIG. 11B.

The storage area to store these pieces of information exists in the RAM 306 or the storage unit 311 shown in FIG. 3. When generating a link operation portion, the position of the corresponding anchor term needs to be obtained accurately. This accurate anchor term position acquisition processing is performed by a mechanism (renderer) for displaying the contents of electronic document data, as will be described later. That is, the renderer searches for an anchor character string and extracts the accurate position information of that portion. The storage capacity is thus saved by storing the position information for each paragraph instead of storing the coordinate information of each character. However, if the number of characters in the unit of storage (paragraph in this example) is large, the anchor character string search processing by the above-described renderer takes time, resulting in an increase in the process load when using the electronic document data.

On the other hand, when the number of characters in the unit of storage is small, the amount of position information to be stored increases. Hence, the effect of saving the storage capacity used in electronic document data generation is undermined. In this example, the paragraph is used as the unit of storage. Various units such as a row and a sentence are also possible. The paragraph is merely an example, and the present invention is applicable to any unit.

As described above using the example, the link information addition target selection unit 501 performs, in step S1006, processing of extracting the position information for the predetermined set unit shown in FIG. 11B, which is to be used to search for an anchor term (anchor character string). In step S1007, the position information is accumulated as the link information 513. The processing of FIG. 10A has been described above.

[Processing Procedure of Link Processing Unit (Link Information Generation)]

Details of the processing in step S808 of FIG. 8 will be described next with reference to FIG. 10B. This processing is performed by the units in the link processing unit 404. The link processing unit 404 extracts link information necessary for link generation and generates a program module to be used for link generation and information to be used by the program module. The information accumulated in step S805 of FIG. 8 while reducing the storage capacity has a format easy to use in this processing. One of the features (points) of the present invention is efficiently processing all pages at once using the accumulated information. The present invention is characterized by performing processing with a relatively heavy load such as fuzzy reference for character recognition in step S808 in consideration of the processing efficiency in the program module executed by the computer when using the electronic document data.

Figure 10A:
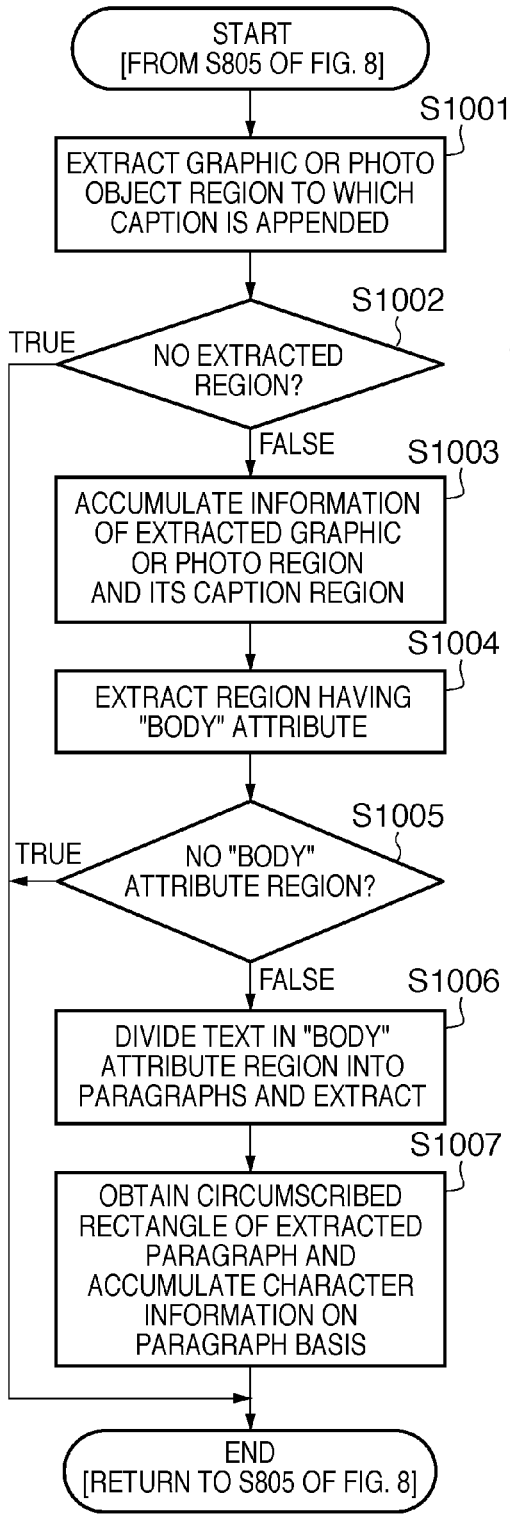
FIGS. 10A and 10B are flowcharts illustrating details of processing.

In step S1011, the anchor term extraction unit 502 starts anchor term extraction processing using the information accumulated in step S805 (FIG. 10A). Out of the accumulated information, information of the caption region appended to the object region having the "graphic" or "photo" attribute (character information in the "caption" attribute region located near each "graphic" or "photo" attribute region generated by the processing in step S805) is used. That is, an anchor term is extracted from character information included in the "caption" region appended to the object region. The anchor term is character information (character string) that identifies an object region such as a graphic or a photo to which a caption is appended in the original document. The caption term is character information (character string) that explains an object region such as a graphic or a photo. The caption appended to a graphic region or a photo region includes only an anchor term, only a caption term, both, or neither.

For example, the anchor term is often expressed by combining a specific character string such as "Figure" or "Fig" with a number or a symbol. In this embodiment, specific character strings that are likely used in the anchor term are prepared as an anchor character string dictionary in advance. The character string in the caption is compared with the anchor character string dictionary, thereby specifying the anchor portion (anchor character string+number/symbol). Out of the character string in the region having the "caption" attribute, the character string other than the anchor term is determined to be a caption term. For example, in a region "FIG. 1 AAA" having the "caption" attribute, "FIG. 1" corresponds to the anchor character string, and "AAA" is the caption term. Sometimes, the number of characters of the caption term is extremely small, or the character string appears to be insignificant (for example, a symbol string "- - - - -"). In such a case, a mark such as a delimiter in the document may have been recognized as a character string, or a non-character portion may have been recognized as a character string. Hence, in this case, the region is determined not to be a caption, and anchor character string extraction is not performed.

In addition, the characters of the anchor term may be wrong because of character misrecognition. Hence, a pattern dictionary to be used to correct character misrecognition is held as spelling information similar to the extracted anchor term, and correction is performed using the dictionary. For example, the number "1" and the lower-case alphabetic character "l" are similar (even a human easily misrecognizes them). This will be described using the example of FIG. 11A. The caption is stored in the cell of character information, and "FIG. 1" is obtained from there.

In step S1012, the link processing control unit 506 determines whether an anchor term has been extracted, and causes a conditional branch. If no anchor term has been extracted in step S1011 (TRUE in step S1012), the processing of FIG. 10B ends. If an anchor term has been extracted (FALSE in step S1012), the process advances to step S1013. In step S1013, the intra-body anchor term search unit 503 adds not only the anchor term obtained in step S1011 but also fuzzy patterns to the search keys. Examples of the fuzzy patterns are character string patterns of figure numbers and the like in many languages, character patterns of spelling fluctuations of figure numbers and the like, and character misrecognition patterns corresponding to them. An anchor term dictionary for the fuzzy reference is generated based on these patterns.

For example, FIG. 12A shows an example of the anchor term dictionary for fuzzy reference generated in step S1013. Since "FIG. 1" has been obtained from the example of FIG. 11A by the processing so far, the anchor term dictionary is generated using it as the original character pattern. Character misrecognition patterns corresponding to the number "1" and spelling fluctuation patterns of "Fig" that stands for "Figure" are added to generate the character patterns for fuzzy reference and thus obtain the anchor term dictionary.

In step S1014, using the anchor term dictionary for fuzzy reference generated in step S1013, the intra-body anchor term search unit 503 performs the batch search for the character information in the body region accumulated for each paragraph in step S805. A list of paragraphs (set units) including the anchor term is generated as the search result. This will be described using the example of FIG. 11B. When the batch search is performed for the search target character information shown in FIG. 11B using the anchor term dictionary for fuzzy reference shown in FIG. 12A, the list shown in FIG. 12B is obtained. For example, character patterns "FIG. 1" and "Figure. 1" are found for text IDs 1111 and 1113 in FIG. 11B, respectively, as can be seen. A plurality of single character patterns in the anchor term dictionary for fuzzy reference may exist in the character information of a single paragraph. Hence, the information of the position in the text (character information) of the paragraph (set unit) is added as the item "position in text". A specific object information extraction unit is thus implemented.

In step S1015, the link processing control unit 506 determines whether the anchor terms in the body have been found (whether a list of regions having the "body" attribute has been generated), and causes a conditional branch. If no list of search results has been generated in step S1014 (TRUE in step S1015), the processing of FIG. 10B ends. If a list of search results has been generated (FALSE in step S1015), the process advances to step S1016.

In step S1016, based on the search result list in step S1014, the object region information accumulated in step S1003, and the body region information of each set unit accumulated in step S1007, the link information generation unit 504 generates link generation information necessary for generating the link between each object region having the "graphic" or "photo" attribute and a corresponding anchor term in the paragraph having the "body" attribute. The link information generation unit 504 calculates and extracts position information such as the coordinates and size of the graphic or photo, position information such as the coordinates and size of the paragraph, and the relationship (combination) between them, which are necessary as the link generation information required to generate the link.

This will be described using the examples of FIGS. 11A and 11B. Link generation information shown in FIG. 12C is generated from the anchor term search result in FIG. 12B. The item "type" stores "graphic" information representing that the link generation indicates a region having the "graphic" attribute or "anchor term in body" information representing that the link generation indicates a paragraph including an anchor term extracted from the "body" attribute region. As shown in the example of FIG. 12C, the values of the coordinates, width, and height of "anchor term in body" are the values of the coordinates, width, and height of a predetermined set unit (in this case, a paragraph unit) including the anchor term. That is, the values are the same as those shown in FIG. 11B. The term "link destination ID" can give the correspondence between the object region having the "graphic" or "photo" attribute and the body paragraph including the corresponding anchor term. A plurality of anchor terms that match a character pattern in the anchor term dictionary for fuzzy reference may exist in a single paragraph region having the "body" attribute. Hence, the anchor terms in the "body" attribute region are arranged in the order of appearance, and the order of anchor term is stored in the term "order". The accurate position of the anchor term in the "body" attribute region is searched for and calculated using the mechanism (renderer) for displaying the contents of electronic document data when using it.

In step S1017, the link generation processing generation unit 505 generates a program module to be used to generate a link between the region having the "graphic" or "photo" attribute and the anchor term in the region having the "body" attribute based on the link generation information obtained in step S1016. This program module is described in a predetermined programming language. Information to be used by the program module is also generated. They are generated based on a predetermined link trigger and link action setting. The program module is added to page drawing data and stored in the electronic document data. That is, the electronic document data generated in step S809 finally includes the page drawing data of each page output in step S806 and the program module added in step S1017. Note that the program module may be defined as one module in advance as the component to implement the link function. Alternatively, the program module may be divided into several components which are combined based on the contents of electronic document data to generate the program module.

The program module actually operates when using the electronic document data. That is, the program module operates at the time of initialization when the mechanism (renderer) for reading out the electronic document data 410 and displaying its contents operates to display the contents on the device, software, or the like in use when using the electronic document data. The software or the like to display the contents of the electronic document data is not particularly limited, and it need only be able to interpret the program and the description format of the electronic document data. The program module has the function of link drawing data to be used to generate data for drawing the link. A description expressing the link function is generated by the operation of the program module.

FIG. 13 shows an example of the program module generated here. This is an example of the program module described using a functional programming language. FIG. 14A illustrates an example of the procedure of processing described in the program module. These are assumed to store the information shown in FIG. 12C as a link information table. They will be described later. When step S1017 has ended, the processing procedure ends. After that, the process advances to step S809 in FIG. 8. FIG. 10B has been described above.

[Processing when Program Module is Executed]

The processing procedure shown in FIG. 14A will be described together with the detailed program module shown in FIG. 13. FIG. 13 shows an example of the program module generated and stored in the electronic document data by the processing shown in FIG. 10B. The link generation information shown in FIG. 12C is assumed to be stored in the electronic document data as a link information table. Note that the processing of FIG. 14A is an operation of reading out and displaying generated electronic document data, which is implemented by causing the CPU 305 of the electronic document display apparatus to read out and execute the program module. In step S1401 (corresponding to a description 1301), the link information table of FIG. 12C is read out to be usable. In step S1402, the number of rows of the link information table is counted (corresponding to a description 1302), and the following processing is performed for all rows based on the conditional branch and loop processing structure of step S1403 (corresponding to a description 1303). When the processing has ended for all rows (NO in step S1403), the processing of FIG. 14A ends.

In step S1404 (corresponding to the descriptions 1303 and 1305), a conditional branch occurs based on the type of link information. If the link information table type is "figure", the process advances to step S1405. If the link information table type is "anchor term in body", the process advances to step S1406. If the object type is neither "figure" nor "anchor term in body", the process returns to step S1403 to shift the process target to the next unprocessed row. Note that in this case, the conditional branch occurs based on the types "figure", "anchor term in body" and others. Instead, the definition of type may be more finely divided into, for example, "table", "photo", and the like so that the conditional branch occurs more specifically based on them.

In step S1405 (corresponding to a description 1304), processing for the object type "figure" is performed. The information described in FIG. 12C includes an instruction to generate a link that provides the operation function. For example, makeLink of the description 1304 is an instruction for the device or software that uses the electronic document data. Hence, the link function is provided by the device or software that executes the program module in the electronic document data. The contents (corresponding to a description 1311) of the generation instruction include the link ID for identification, the display page, the X and Y coordinates, the width and height, an image such as an icon representing the operation function, an original character pattern to be used to simplified display of the contents, and the link destination ID representing the moving destination of the display portion when operated. The link ID of the moving destination is designated as a list structure to cope with a case in which a plurality of anchor terms exists in the body. After the processing in step S1405, the process returns to step S1403 to shift the process target to the next row.

In step S1406 (corresponding to a description 1306), processing for the link information type "anchor term in body" is performed. The information described in FIG. 12C is searched for the position of the anchor term so as to acquire the position information. From a description 1312, the page where the anchor term is stored, the X and Y coordinates, the width and height and the character pattern are obtained. The acquired X and Y coordinates, width and height of the anchor characters are stored in a variable "anchorArea" that stores the values of the X and Y coordinates, width and height. In the description 1306, "searchText" is an instruction to be executed by the device or software that uses the electronic document data. The function is provided by the device or software to search for a designated character string in the designated region and return the display position (X and Y coordinates, width and height).

Not the information of the item "original character pattern" but that of the item "character pattern" in FIG. 12C is used to designate the anchor term. This is because if character misrecognition has occurred, the renderer for the electronic document data yields a misrecognized character string. The reason is that in the processing of FIG. 10B, the anchor character string search is performed so that fuzzy reference to cope with the character misrecognition or spelling fluctuations is performed in advance. In case of the character misrecognition or spelling fluctuation, the character string output in the page unit processing of the electronic document data includes the character misrecognition or spelling fluctuation.

Figure 10B:
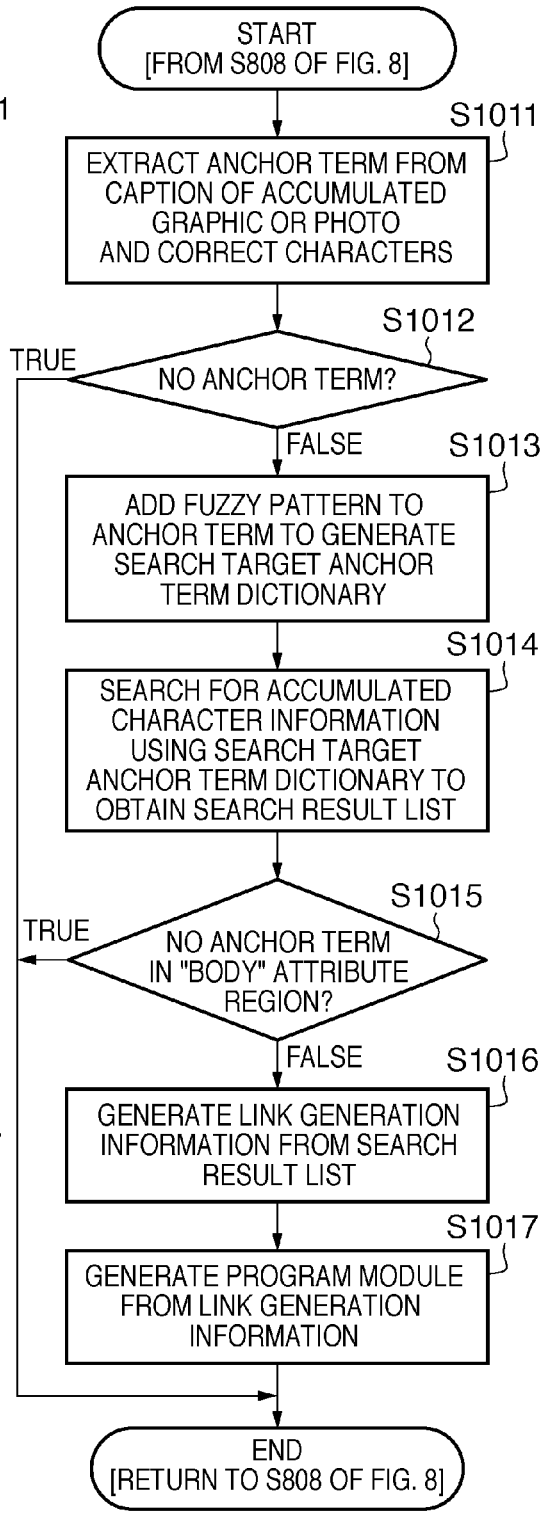

The correct character string pattern is held by the fuzzy reference in the processing of FIG. 10B. The character string patterns of the character misrecognition and spelling fluctuations are also held. The renderer for the electronic document data performs the search using the patterns. More specifically, the patterns are held as the item "character pattern" in FIG. 12C. Hence, in this search, only a high-speed simple character string search function suffices. That is, the fuzzy reference with a heavy process load is performed when generating the electronic document data (more specifically, when all pages have been analyzed), as described above. Using the result, the renderer performs only the simple search with a very light process load when using the electronic document data. The processing is thus distributed because the heavy process load of the renderer makes the electronic document data difficult to use.

FIG. 14B shows a result obtained by performing the processing of step S1406 for the example shown in FIG. 12C. This processing result is stored in the variable "anchorArea" defined in the description 1306. In processing of step S1407 (corresponding to a description 1307), an instruction to generate a link function for providing the operation for the link information type "anchor term in body" is defined. This is the same as in step S1405. However, as the X and Y coordinates, width, and height to be designated, those obtained in step S1406 are used. After the processing in step S1407, the process returns to step S1403 to shift the process target to the next row in the link information table. The processing shown in FIGS. 13 and 14A has been described above.

[Processing Result]

FIGS. 15A, 15B, 15C, and 15D show parts of data generated by applying the processing described with reference to FIGS. 13 and 14A. FIG. 15A shows an example of the description of the link generated for the image data 902. FIG. 15B shows an example of the description of the link generated for the image data 901. FIGS. 15C and 15D show functions newly added to the description of the page drawing data by the above-described processing.

Figure 16:
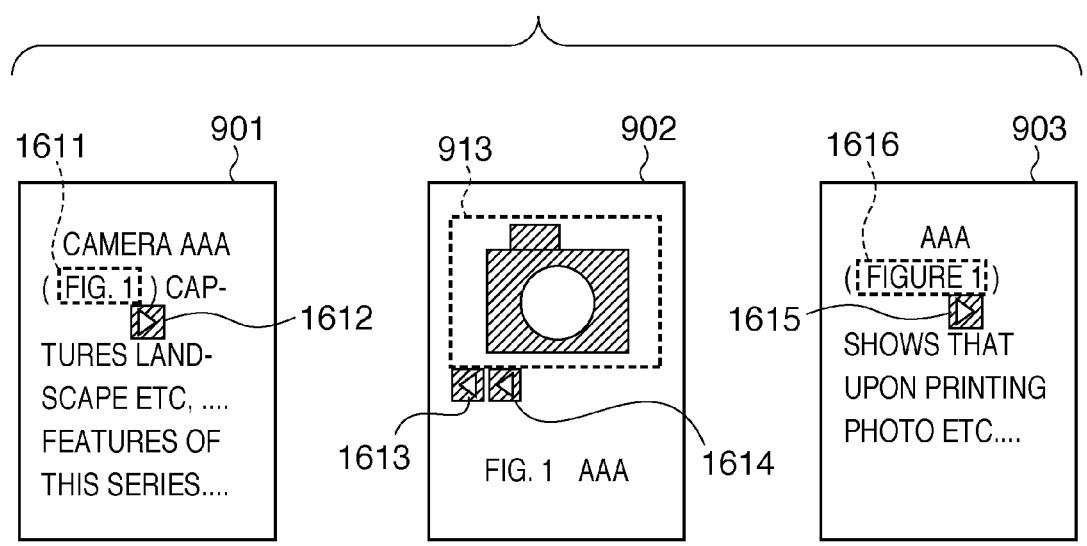
FIG. 16 is a view for explaining the contents of displayed document data.

FIG. 16 explains operation function display that occurs when the portions shown in FIGS. 15A to 15D are added. FIG. 16 illustrates the display contents of the electronic document data generated from the image data 901 to 903 shown in FIG. 9A. The image data 901 to 903 and the region 913 in FIG. 16 are the same as those denoted by the same reference numerals in FIG. 9. When the processing of FIG. 14A is executed based on the information of FIG. 12C, a link to the graphic region is generated, like a description 1501 in FIG. 15A, by the "makeLink" instruction of the description 1304 in FIG. 13. The description 1501 includes the X and Y coordinates, width and height representing the position to execute the added link operation function, the call of the function shown in FIG. 15C that is the added function, and the link destination ID representing the moving destination upon calling the function.

Referring to FIG. 16, when using the image data 902, a frame indicating the region 913 and operation buttons 1613 and 1614 appear in the display of the image data 902. When the user clicks on the operation button 1613 (x: field_id=1221), the "onClickAtFigure (1221)" function assigned to "onclick" in the description 1501 is called to execute the processing of the function defined in FIG. 15C. This causes the display to directly transit to the image data 901 and highlights the portion of a corresponding anchor term 1611.

Similarly, when the processing of FIG. 14A is executed based on the information of FIG. 12C, a link to the anchor term in the body region is generated, like a description 1502 in FIG. 15B, by the "makeLink" instruction of the description 1307 in FIG. 13. The description 1502 includes the X and Y coordinates, width and height representing the position to execute the added link operation function, the call of the function shown in FIG. 15D that is the added function, and the link destination ID representing the moving destination upon calling the function. Note that the X and Y coordinates, width and height of the added operation function are obtained by executing the description 1306 in step S1406. FIG. 15B shows the result. When the user is using the image data 901, the frame indication 1611 and an operation button 1612 are displayed in the place of the anchor term on the image data 901 based on the description 1502. When the user clicks on the operation button 1612, the "onClickAtAnchortext (1222)" function assigned to "onclick" in the description 1502 is called to execute the processing defined in FIG. 15D. This moves the display position to the image data 902 and highlights the associated graphic region 913 (x: field_id=1222).

As described above, when the user generates electronic document data having the cross link function that enables movement between a graphic and the explanation portion of the graphic in a document, analysis processing is performed for each page to reduce the storage capacity necessary for the page processing. That is, instead of holding the coordinate positions on a character basis, the position information is held for a predetermined unit (for example, a paragraph unit), thereby reducing the necessary storage capacity. In addition, for the accurate position of an anchor term such as a figure number, the search is executed when using the electronic document data, thereby allowing accurate placement of the link.

The fuzzy reference with a heavy process load for OCR or spelling fluctuations is done at the time of electronic document data generation so that the process load becomes lighter in processing of searching for an anchor term to be executed and deciding the link position when using the electronic document data. This enables the implementation of an efficient cross link in this embodiment.

Second Embodiment

In the above-described operation according to the first embodiment, the predetermined set unit to hold character position information upon page-basis processing is the paragraph unit. This decreases the information amount and thus reduces the storage capacity. In addition to the paragraph, reduction for each row or sentence has been exemplified.

However, the density of texts or characters in a document generally changes depending on the contents or writing style of the document, and also changes even in one document. Especially, a page in which the number of texts or characters is extremely small may be defined as one unit in itself. In this embodiment, the set unit to hold the character position information is dynamically changed in accordance with the amount of texts or characters in a page.

FIG. 17 is a flowchart for explaining this processing which is obtained by adding processes to FIG. 10A. Steps S1701 to S1705 of FIG. 17 are the same as steps S1001 to S1005 of FIG. 10A, and a description thereof will not be repeated. In step S1711, a link processing control unit 506 determines whether the amount of characters included in the body attribute region extracted in step S1704 is large, and causes a conditional branch based on the result. If the amount of characters is large (YES in step S1711), the process advances to step S1706 to perform the same processing as in step S1016 and S1017 of FIG. 10A. If the amount of characters is small (NO in step S1711), the process advances to step S1712 to set the character information in the body attribute region directly as one set unit, instead of using the paragraph unit as the predetermined set unit. The character information and position information in the body region are accumulated. Note that the criterion used in step S1711 may be defined in advance as a threshold. The threshold may be decided experimentally or changed in accordance with the free space state of the memory resource of the device that executes the processing.

In this way, when the user generates electronic document data having the cross link function that enables movement between a graphic and the explanation portion of the graphic in a document, analysis processing is performed for each page to reduce the storage capacity necessary for the page processing. That is, instead of holding the coordinate positions on a character basis, the position information is held for a predetermined set unit (for example, a paragraph unit), thereby reducing the necessary storage capacity. In the second embodiment, the set unit is dynamically changed in accordance with the amount of characters described in a document, thereby efficiently reducing the storage capacity.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-154360, filed Jul. 6, 2010 and 2011-129548, filed Jun. 9, 2011, which are hereby incorporated by reference herein in their entirety.

What is claimed is:

1. An image processing apparatus comprising:
   a region division unit configured to divide a document image that is specified as a processing target page from among a document image containing a plurality of pages into a body region, a caption region, and an object region to which the caption region is appended;
   a character information acquisition unit configured to acquire character information included in each of the body region and the caption region divided by said region division unit;
   an accumulation unit configured to divide the character information acquired from the body region into predetermined set units and to accumulate the character information and position information of the divided set unit in a memory;
   a page drawing data generation unit configured to generate page drawing data of the document image of the processing target page and to output the page drawing data;
   a repeating unit configured to repeat execution of processes by the region division unit, the character information acquisition unit, the accumulation unit, and the page drawing data generation unit for each page of the document image containing the plurality of pages as the processing target page, in order;
   an anchor term extraction unit configured to, after the processes by the region division unit, the character information acquisition unit, the accumulation unit, and the page drawing data generation unit have been executed for all pages of the document image containing the plurality of pages by repeating by the repeating unit, extract an anchor term from the character information acquired from the caption region;
   an anchor term search unit configured to search, based on the character information accumulated in the memory for each set unit, for the set unit including the anchor term extracted by said anchor term extraction unit;
   a link information generation unit configured to generate link generation information that associates the set unit found by said anchor term search unit with the object region to which the caption region including the anchor term is appended; and
   an electronic document data generation unit configured to generate, based on the link generation information, electronic document data including a program code to be used to generate a description for representing a link function between the object region and the anchor term in the set unit and the page drawing data outputted by said page drawing data generation unit,
   wherein the program code included in the electronic document data dynamically generates the description for representing the link function between the object region and the anchor term in the set unit by operating when using the electronic document.

2. The apparatus according to claim 1, wherein said anchor term search unit also searches for a set unit including a fuzzy pattern of the anchor term extracted by said anchor term extraction unit.

3. The apparatus according to claim 1, wherein the object region is a region having at least one of a graphic attribute, a photo attribute, and a table attribute.

4. The apparatus according to claim 1, wherein said accumulation unit divides the character information acquired from the body region into set units corresponding to an amount of characters included in the document image and accumulates the character information and the position information of the divided set unit in the memory.

5. A method using a processor to perform the steps of:
   dividing a document image that is specified as a processing target page from among a document image containing a plurality of pages into a body region, a caption region, and an object region to which the caption region is appended;
   acquiring character information included in each of the body region and the caption region divided in the step of dividing the document image;
   dividing the character information acquired from the body region into predetermined set units and accumulating the character information and position information of the divided set unit in a memory;
   generating page drawing data of the document image of the processing target page and outputting the page drawing data;

repeating execution processes in the dividing step, the acquiring step, the dividing the character information step, and the generating page drawing data step for each page of the document image containing the plurality of pages as the processing target page, in order;

after the processes in the dividing step, the acquiring step, the dividing the character information step, and the generating page drawing data step have been executed for all pages of the document image containing the plurality of pages in the repeating step, extracting an anchor term from the character information acquired from the caption region;

searching, based on the character information accumulated in the memory for each set unit, for the set unit including the anchor term extracted in the step of extracting the anchor term;

generating link generation information that associates the set unit found in the step of searching for the set unit with the object region to which the caption region including the anchor term is appended; and generating, based on the link generation information, electronic document data including a program code to be used to generate a description for representing a link function between the object region and the anchor term in the set unit and the page drawing data outputted in the generating page drawing data step, wherein the program code included in the electronic document data dynamically generates the description for representing the link function between the object region and the anchor term in the set unit by operating when using the electronic document.

6. A non-transitory storage medium storing a computer program that causes a processor to perform the steps of:

dividing a document image that is specified as a processing target page among a document image of a plurality of pages into a body region, a caption region, and an object region to which the caption region is appended;

acquiring character information included in each of the body region and the caption region divided in the step of dividing the document image;

dividing the character information acquired from the body region into predetermined set units and accumulating the character information and position information of the divided set unit in a memory;

generating page drawing data of the document image of the processing target page and outputting the page drawing data;

repeating execution processes in the dividing step, the acquiring step, the dividing the character information step, and the generating page drawing data step for each page of the document image containing the plurality of pages as the processing target page, in order;

after the processes in the dividing step, the acquiring step, the dividing the character information step, and the generating page drawing data step have been executed for all pages of the document image containing the plurality of pages in the repeating step, extracting an anchor term from the character information acquired from the caption region;

searching, based on the character information accumulated in the memory for each set unit, for the set unit including the anchor term extracted in the step of extracting the anchor term;

generating link generation information that associates the set unit found in the step of searching for the set unit with the object region to which the caption region including the anchor term is appended; and generating, based on the link generation information, electronic document data including a program code to be used to generate a description for representing a link function between the object region and the anchor term in the set unit and the page drawing data in the generating page drawing data step, wherein the program code included in the electronic document data dynamically generates the description for representing the link function between the object region and the anchor term in the set unit by operating when using the electronic document.

* * * * *